(12) United States Patent
Guernsey et al.

(10) Patent No.: US 10,663,342 B2
(45) Date of Patent: May 26, 2020

(54) DIVERTING CHECKWEIGHER

(71) Applicant: Laitram, L.L.C., Harahan, LA (US)

(72) Inventors: Kevin W. Guernsey, Destin, FL (US); Brian R. Lee, Jordan, MN (US)

(73) Assignee: Laitram, L.L.C., Harahan, LA (US)

( * ) Notice: Subject to any disclaimer, the term of this patent is extended or adjusted under 35 U.S.C. 154(b) by 206 days.

(21) Appl. No.: 15/742,613

(22) PCT Filed: Jun. 20, 2016

(86) PCT No.: PCT/US2016/038406
§ 371 (c)(1),
(2) Date: Jan. 8, 2018

(87) PCT Pub. No.: WO2017/011149
PCT Pub. Date: Jan. 19, 2017

(65) Prior Publication Data
US 2018/0202855 A1    Jul. 19, 2018

Related U.S. Application Data

(60) Provisional application No. 62/191,696, filed on Jul. 13, 2015.

(51) Int. Cl.
*G01G 11/04* (2006.01)
*B65G 47/52* (2006.01)
(Continued)

(52) U.S. Cl.
CPC ........... *G01G 11/003* (2013.01); *B65G 47/54* (2013.01); *B65G 47/844* (2013.01);
(Continued)

(58) Field of Classification Search
CPC ...... G01G 11/003; G01G 11/04; G01G 11/12; B65G 47/54; B65G 2207/36; B65G 47/844
See application file for complete search history.

(56) References Cited

U.S. PATENT DOCUMENTS 3,167,171 A    1/1965   Harmon et al.
4,426,006 A *  1/1984   Horii .................. B07C 5/18
                                              177/145
(Continued)

FOREIGN PATENT DOCUMENTS

BE        1014687 A3    3/2004
DE    102005007866 A1    8/2006
(Continued)

OTHER PUBLICATIONS

Extended European Search Report, European Application No. 16824863.1, dated Jun. 4, 2019, European Patent Office, Munich, Germany.

*Primary Examiner* — Randy W Gibson
(74) *Attorney, Agent, or Firm* — James T. Cronvich

(57) ABSTRACT

A diverting checkweigher comprising a conveyor belt with product-carrying, vertically floating slats that are supported on a weigh scale as the belt passes over it. The floating slats isolate product weight from belt weight. The slats themselves may be laterally stationary or divertible. If divertible, they can divert products based on their weights. If not divertible, the slats can be used with product pushers to divert products for weight-based sorting or rejection. The slats have legs that extend below the bottom of the belt to ride on the scale or be diverted across the belt by a diverter. The pushers are diverted by a diverter.

21 Claims, 12 Drawing Sheets

(51) Int. Cl.
  G01G 11/00 (2006.01)
  B65G 47/54 (2006.01)
  B65G 47/84 (2006.01)
  G01G 11/12 (2006.01)

(52) U.S. Cl.
  CPC .......... *B65G 2207/36* (2013.01); *G01G 11/04* (2013.01); *G01G 11/12* (2013.01)

(56) References Cited

U.S. PATENT DOCUMENTS

| | | | | |
|---|---|---|---|---|
| 4,660,665 A | * | 4/1987 | Powell, Jr. ........... | G01G 11/003 |
| | | | | 177/1 |
| 5,101,982 A | | 4/1992 | Gentili | |
| 5,306,877 A | * | 4/1994 | Tas ........................ | B07C 5/18 |
| | | | | 177/145 |
| 5,677,516 A | * | 10/1997 | Leverett ................ | B07C 5/18 |
| | | | | 177/145 |
| 8,985,304 B2 | | 3/2015 | Guernsey et al. | |
| 2002/0148708 A1 | | 10/2002 | Bonnet | |
| 2003/0168312 A1 | | 9/2003 | Veit et al. | |
| 2014/0332342 A1 | | 11/2014 | Guernsey | |

FOREIGN PATENT DOCUMENTS

| | | | |
|---|---|---|---|
| EP | 1444489 | B1 | 6/2012 |
| JP | 57-019074 | A | 2/1982 |
| JP | 62-136285 | U | 8/1987 |
| JP | 2000249591 | A | 9/2000 |
| JP | 2004101383 | A | 4/2004 |
| JP | 2006194859 | A | 7/2006 |
| KR | 10-1255755 | B1 | 4/2013 |
| WO | 2014008135 | A1 | 1/2014 |

* cited by examiner

DIVERTING CHECKWEIGHER

BACKGROUND

The invention relates generally to belt-conveyor checkweighers and product diverters.

In many production lines, conveyed products are weighed by checkweighers, and the weights used to grade, batch, label, price, or check product quality or uniformity. Checkweighers are typically located in a conveyor line so that they can weigh the products "in line" and possibly also "in motion," i.e., without stopping product flow. A conventional checkweigher comprises a short length of conveyor belt running atop a scale table that freely supports the belt and the conveyed products on the belt while making a weight measurement. Often, products are fed onto the checkweigher by a gapping conveyor that accelerates the products to pull a gap between consecutive products. In that way only one product at a time rests on the checkweigher's scale. Once weighed, a product transfers to a reject, grading, or other selective diverting conveyor for proper dispositioning according to the product's weight. Common diverters use pneumatic pusher arms, paddle arms, air blasts, or tilting conveyers to divert products to their proper destinations.

One of the problems with conventional systems as described is that there are four product transfers across gaps between sequential conveyor elements: (1) transfers onto the gapping belt; (2) transfers from the gapping belt to the checkweigher belt; (3) transfers from the checkweigher belt to the diverting conveyor; and (4) transfers off the diverting conveyor to downstream handling. Each of these transfers can jostle the product, causing it to change its orientation and perhaps cause a jam on the production line. If orientation is important—as it often is—the product has to be "styled" back to its original orientation if the jostling is too great. Furthermore, paddles or pushers can mar product labels.

SUMMARY

One version of a checkweigher belt embodying features of the invention comprises an endless belt body and a plurality of vertically floating, product-supporting weigh platforms located at spaced apart locations along the length of the endless belt body. The weigh platforms are movable from a first position sitting on the belt body to a second position spaced apart from the belt body.

Another version of a checkweigher belt embodying features of the invention comprises an endless belt body advancing in a direction of belt travel along a carryway. The endless belt body bears the belt tension and has an outer surface that extends along its width from a first side edge to an opposite second side edge. Product-supporting slats spaced are apart along the length of the belt body in the direction of belt travel. Each of the slats is elongated along the width of the belt body and is movable from a first position sitting on the outer surface of the belt body to a second position spaced apart from the outer surface of the belt body in a direction perpendicular to the outer surface of the belt body.

In another aspect a diverting checkweigher embodying features of the invention comprises a carryway and a checkweigher belt advancing along the carryway in a direction of belt travel. The checkweigher belt includes an endless belt body that bears the belt tension and has a top surface and an opposite bottom extending along the width of the checkweigher belt from a first side to an opposite second side. Product-supporting slats are spaced apart along the length of the checkweigher belt in the direction of belt travel. Each of the slats is elongated along the width of the checkweigher belt and includes one or more protrusions that extend below the bottom of the endless belt body. A weigh scale having a weigh plate lies under the bottom of the endless belt body in the carryway. The weigh plate is positioned to contact the protrusions as they pass by on the advancing checkweigher belt to lift the slats from a lowered position sitting on the top surface of the belt body to a raised position spaced apart from the top surface of the belt body so that the weights of the products supported on the raised slats are borne by the weigh plate and measured by the weigh scale.

DETAILED DESCRIPTION

Figure 1A:
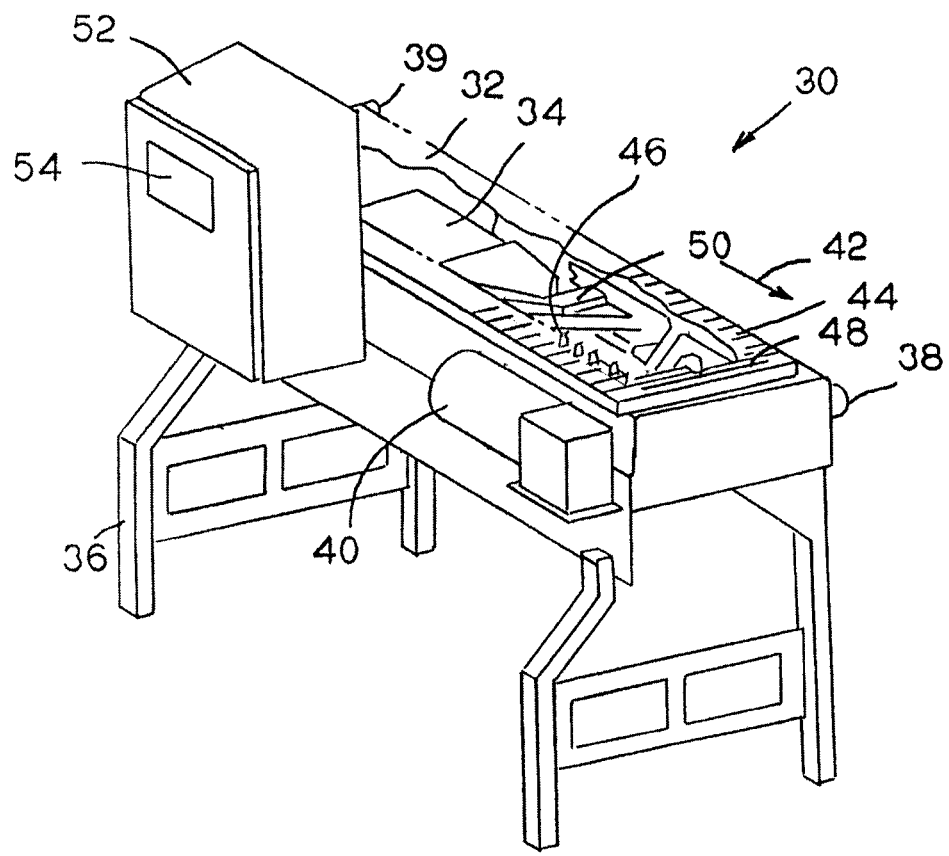
FIGS. 1A and 1B are partly cutaway isometric and top plan views of one version of a diverting checkweigher embodying features of the invention.
Figure 1B:
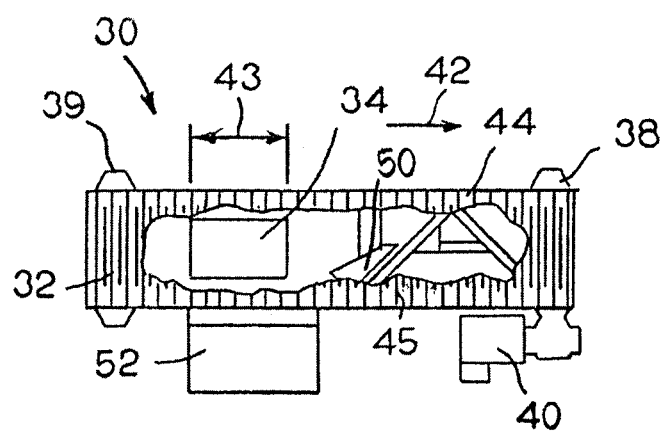

One version of a diverting checkweigher embodying features of the invention is shown in FIGS. 1A and 1B. The checkweigher 30 comprises an endless conveyor belt 32 and a weigh table or scale 34 supported in a frame 36. The conveyor belt 32 is trained around drive and idle sprockets and shafts 38, 39 at opposite ends of a carryway. A drive motor 40 coupled to the drive shaft 38 drives the belt 32 in a direction of belt travel 42. The weigh scale 34 lies under the conveyor belt 34 and defines a weigh zone 43 on a portion of the carryway. The belt 32 is constructed of a series of belt modules 44 connected together at hinge joints 45 into an endless belt. Products on the belt in the weigh zone 43 are weighed by the scale 34. The conveyor belt 32 has product pushers in the form of pegs 46 in slots 48 that extend along the width of the belt modules 44. A peg diverter switch in the carryway downstream of the scale 34 allows the pegs 46 either to remain in their positions or to slide along their slots 48 to divert products to the side. For example, the switch can be set to divert products that are too heavy or too light. A controller 52 displays product weights on a display 54 and controls the operation of the diverter switch 50 as a function of the measured weight. The controller 52 can also control the starting, stopping, and the speed of the belt's drive motor 40.

Figure 2A:
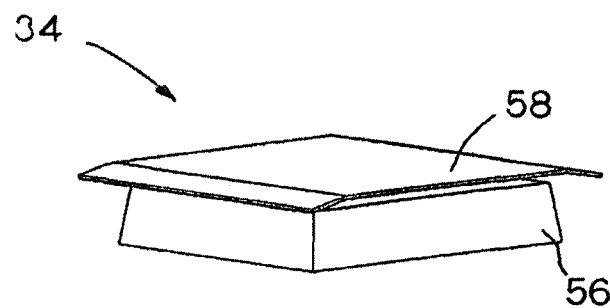
FIGS. 2A and 2B are axonometric and side elevation views of weigh scales usable in the diverting checkweigher of FIG. 1A.
Figure 2B:
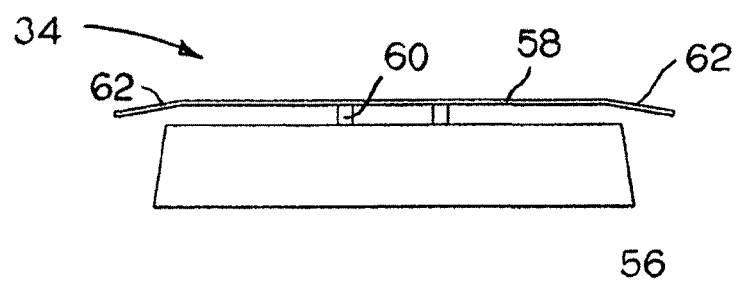

The weigh scale 34 is shown in more detail in FIGS. 2A and 2B. The scale has a lower enclosure 56 housing the weighing components and electronics for sending weight signals to the controller. A weigh plate 58 is connected to one or more legs 60 that transmit the weight on the plate to the scale. The two ends 62 of the weigh plate 58 are bent downward away from the scale to form ramps guiding the belt gradually onto and off the scale 34.

Figure 3:
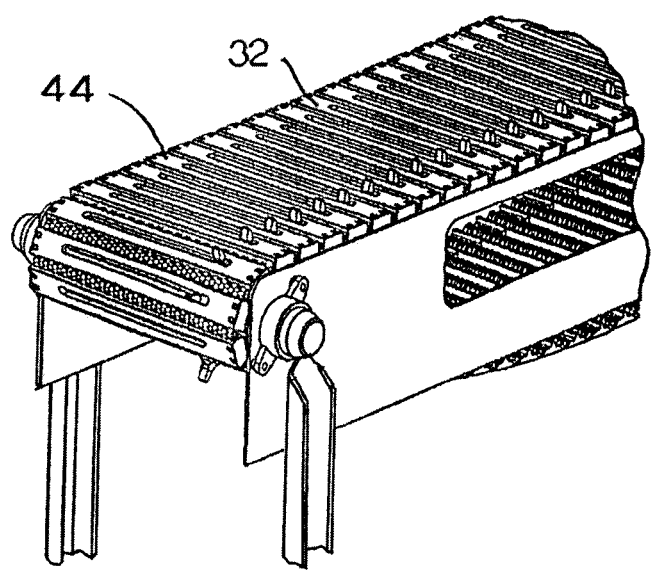
FIG. 3 is an isometric view of a portion of the conveyor belt in the diverting checkweigher of FIG. 1A.
Figure 4A:
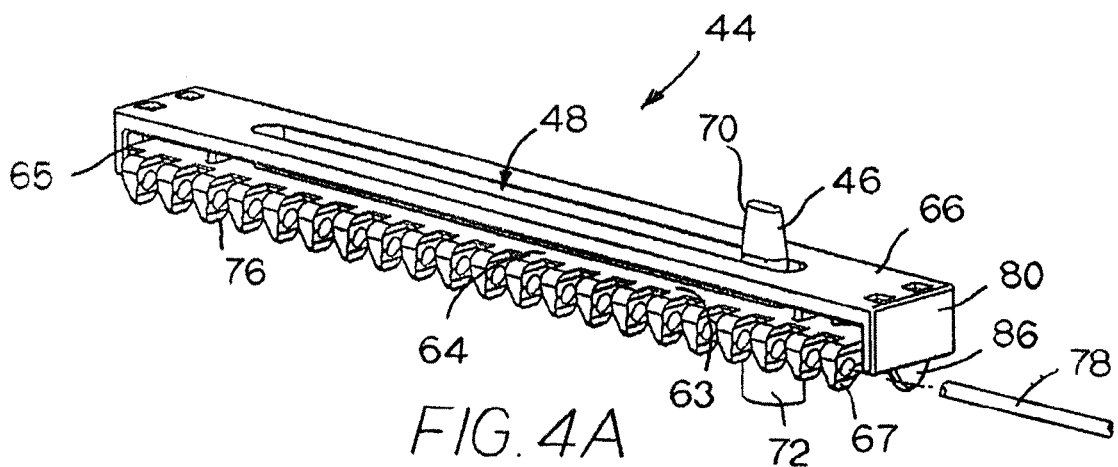
FIGS. 4A and 4B are axonometric and exploded views of one of the belt modules of the conveyor belt of FIG. 3.
Figure 4B:
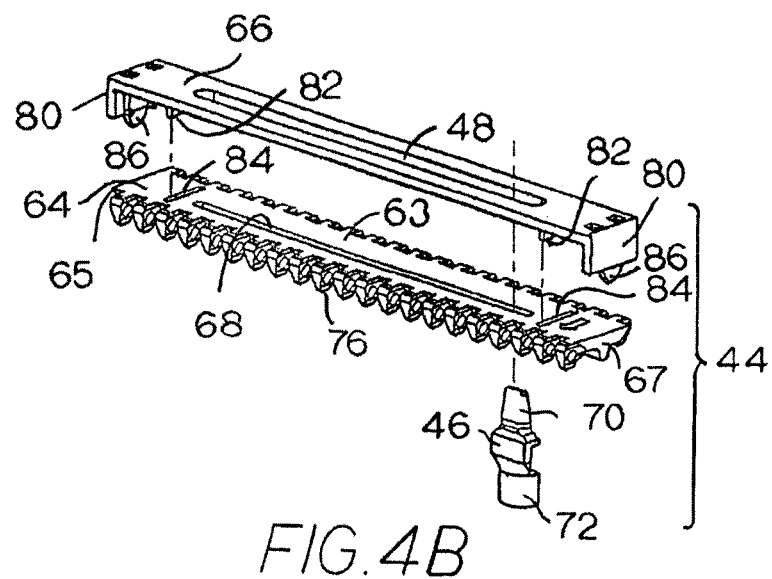

FIG. 3 shows the diverter belt 32 in more detail, and FIGS. 4A and 4B show the belt modules 44 used to construct the belt in even more detail. The belt modules 44 used to construct the belt 32 comprise a base 64, a slat 66, and the peg 46. The module base 64, which supports the slat 66, has a planar outer surface 63 that extends along the width of the belt 32 from a first side edge 65 to an opposite second side edge 67. The bottom of the base 64 defines the bottom of the belt 32. The slot 48 that extends along the width of the slat 66 aligns vertically with a slot 68 in the base 64. The pusher peg 46 is received in the aligned slots 48, 68 to ride along the width of the module 44. The peg 46 has a top pusher portion 70 above the slat 66 to push products conveyed atop the belt 32. The peg 46 has a bottom cam follower 72 that extends from the slots 48, 68 past the bottom of the base 64. The peg 46 also serves as a retainer retaining the slat 66 to the base 64. The base 64 also has hinge elements 76 along each end that interleave with the hinge elements of adjacent modules. The interleaved bases 64 form an endless belt body that bears all the belt tension. The interleaved hinge elements are connected by a hinge pin 78 to form a hinge joint between consecutive modules 44.

Figure 5:
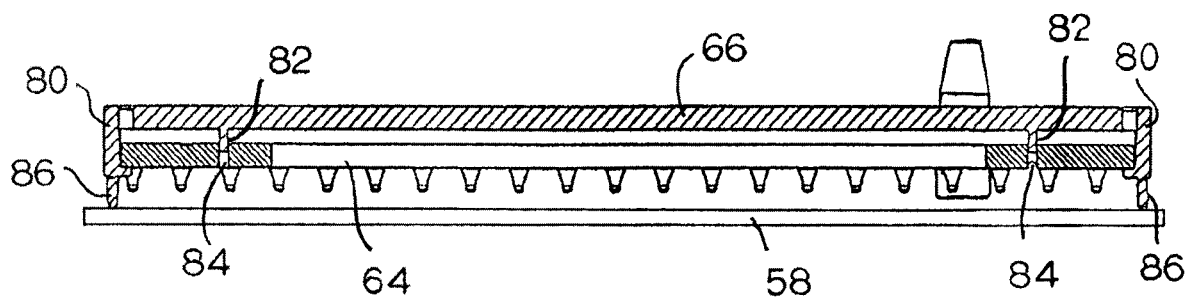
FIG. 5 is a cross section of the conveyor belt of FIG. 3 over a weigh scale.
Figure 6A:
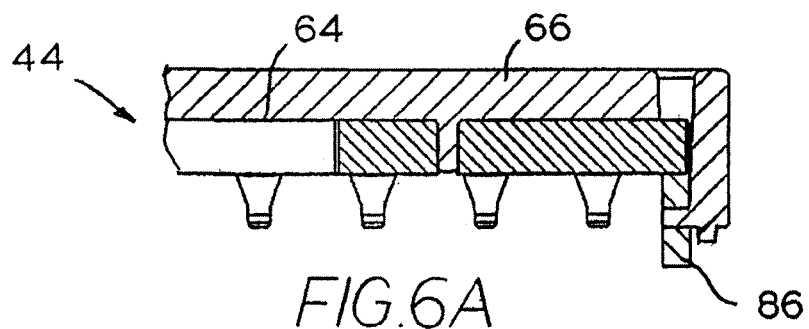
FIGS. 6A and 6B are enlarged cross sections of one edge of the conveyor belt of FIG. 3 away from and above the weigh scale.
Figure 6B:
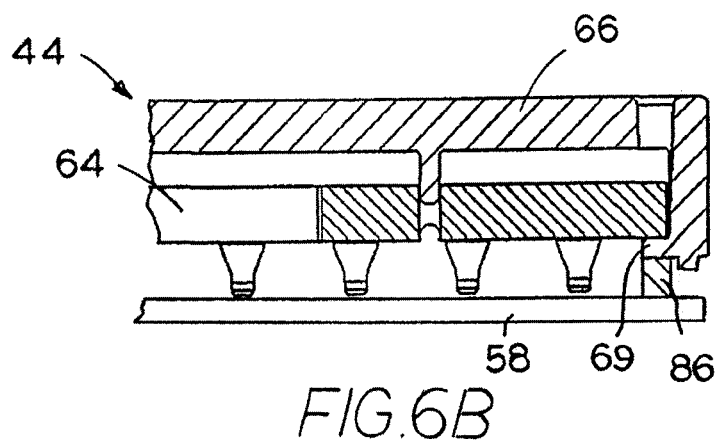

As also shown in FIG. 5, the slat 66 extends just past the sides of the base 64. Aprons 80 at the sides of the slat 66 extend downward around the base 64 and from a side edge of the belt. Locating bosses 82 extend downward from the slat 66 into locating slots 84 in the base 64 to register the base and slat in precise alignment. Protrusions in the form of skids 86 extend downward from the slat 66 at both sides and below the bottom of the module base 64. As shown in FIG. 5, and also in FIGS. 6A and 6B, the skids 86 ride on the weigh plate 58 of the weigh scale. The level of the weigh plate 58 is high enough relative to the level of the wearstrips supporting the base 64 in the carryway to cause the skids 86 to lift the slat 66 off the top outer surface of the base 64 so that the skids bear all the weight of the product on the slat and transfer it to the scale for the weight measurement to be made. The protrusions 86 could include rollers to roll along the weigh plate 58 with less friction than the skids. FIG. 6A shows the belt module 44 with the slat 66 in a lowered position resting on the top of the module base 64 because the skids 86 are not riding on the weigh scale. In FIG. 6B the skids 86 are riding on the weigh plate 58 lifting the slat 66 to its raised position above the base 64. Horizontal tabs 69 at the bottoms of the aprons 80 form stops that contact the bottom of the base 64 to limit the lifting of the slat 66 and serve as retainers retaining the slat to the base along with the peg 46. Thus, the slat 66 can float vertically above the base 64 through a limited range to isolate the weight of the belt from the weight of the product.

Figure 7:
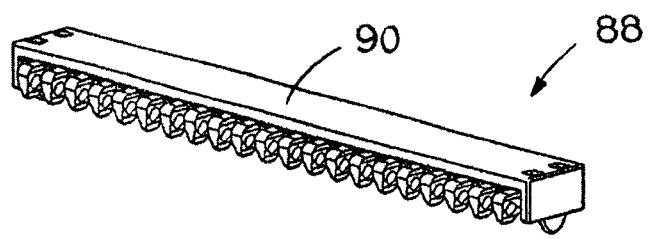
FIG. 7 is an axonometric view of another version of a belt module as in FIG. 4A, but without a diverting peg.
Figure 8:
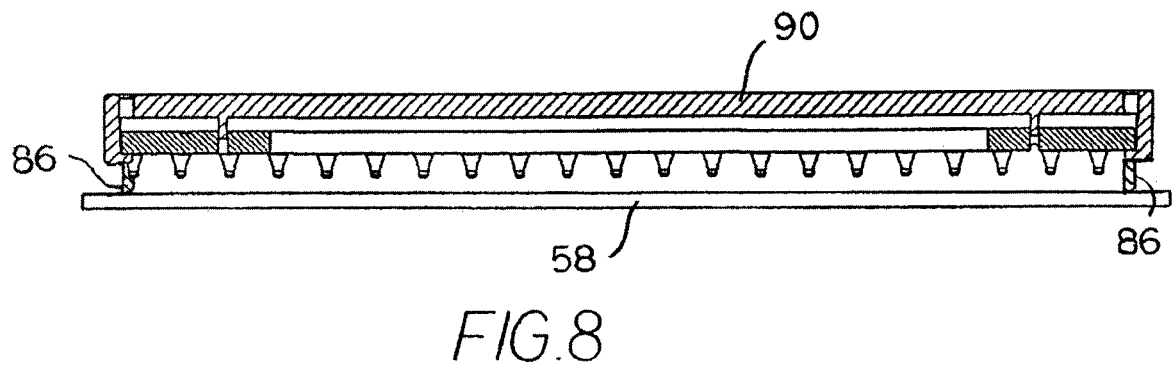
FIG. 8 is a cross section of a conveyor belt through a module as in FIG. 7 over a weigh scale.
Figure 9:
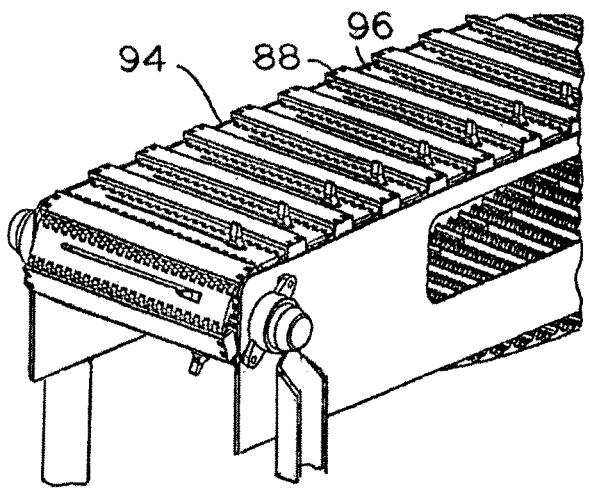
FIG. 9 is an isometric view of a conveyor belt made up of modules as in FIG. 7 alternating with diverting peg modules from belt row to belt row.

FIG. 7 shows a belt module 88 similar to that of FIG. 4B, except that the slat 90 does not have a slot 48 for a peg. The module base 92 may or may not have a slot 68 as in the base 64 shown in FIG. 4B. In all other respects the module of FIG. 7 is identical to that of FIG. 4B. The slotless slat 90 is shown in its raised position with the protrusions 86 riding on the weigh plate 58. As shown in FIG. 9, a conveyor belt 94 is constructed using modules 88 as in FIG. 7 alternating with diverting peg modules 96. Thus, the modules 88 with slats are weigh modules, and the peg modules 96 are divert modules. The bases of the two modules are similar with interleaved hinge elements hingedly linking the modules 88, 96 together to form the checkweigher-diverter belt 94.

Figure 10:
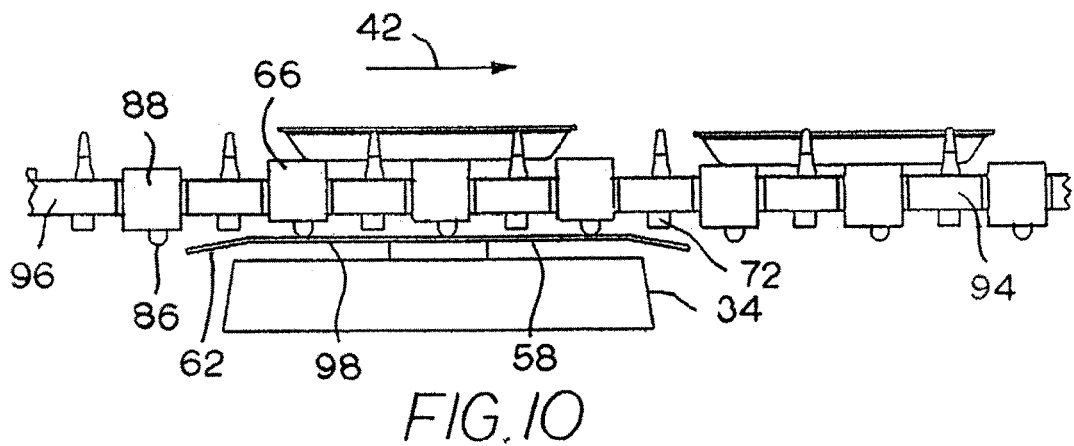
FIG. 10 is a side elevation view of a portion of the conveyor belt of FIG. 9 over a weigh scale.
Figure 11:
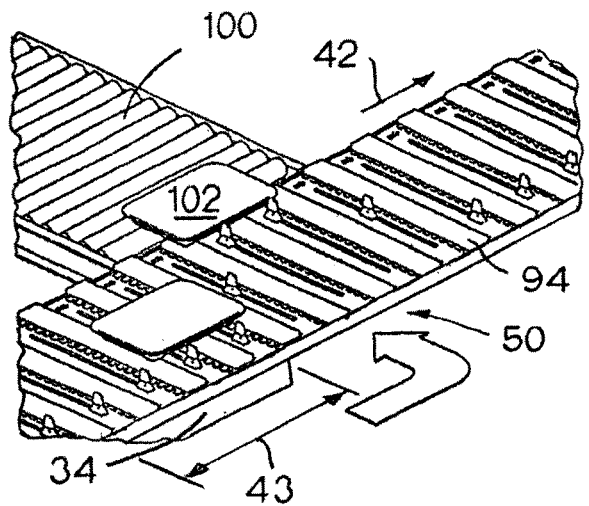
FIG. 11 is an isometric view of a diverting checkweigher constructed of a conveyor belt as in FIG. 9 diverting rejects to a reject conveyor.

FIG. 10 shows the conveyor belt 94 of FIG. 9 constructed of alternating weigh modules 88 and divert modules 96 on a weigh scale 34. As the belt 94 advances in the direction of belt travel 42, the skids 86 encounter the entrance ramp 62 of the scale's weigh plate 58. The skids 86 ride up the ramp 62 and onto the horizontal portion 98 of the plate 58. In so doing, the skids raise the slat 66 to its raised position for weighing the conveyed product. The bottoms of the cams 72 on the pegs are above the level of the bottoms of the skids 86 in both the raised and lowered positions of the slats 66. The belt of FIGS. 9 and 10 is shown in a diverting conveyor system in FIG. 11. Downstream of a weigh scale 34, a discharge conveyor 100 is positioned to receive products, such as products in trays 102, diverted or sorted off the side of the belt 94 advancing in the direction of belt travel 42. A divert switch 50 under the belt just after the weigh zone 43 selectively diverts the trays from the belt to the discharge conveyor 100 depending on the weight of the tray as measured by the weigh scale 34. Of course, more than one discharge conveyor could be positioned along the length of the conveyor belt 94 in a sorting application, such as grading by weight. And the belt 32 of FIG. 1 could be used instead of the belt 94 in the conveyor configuration of FIG. 11.

Figure 12:
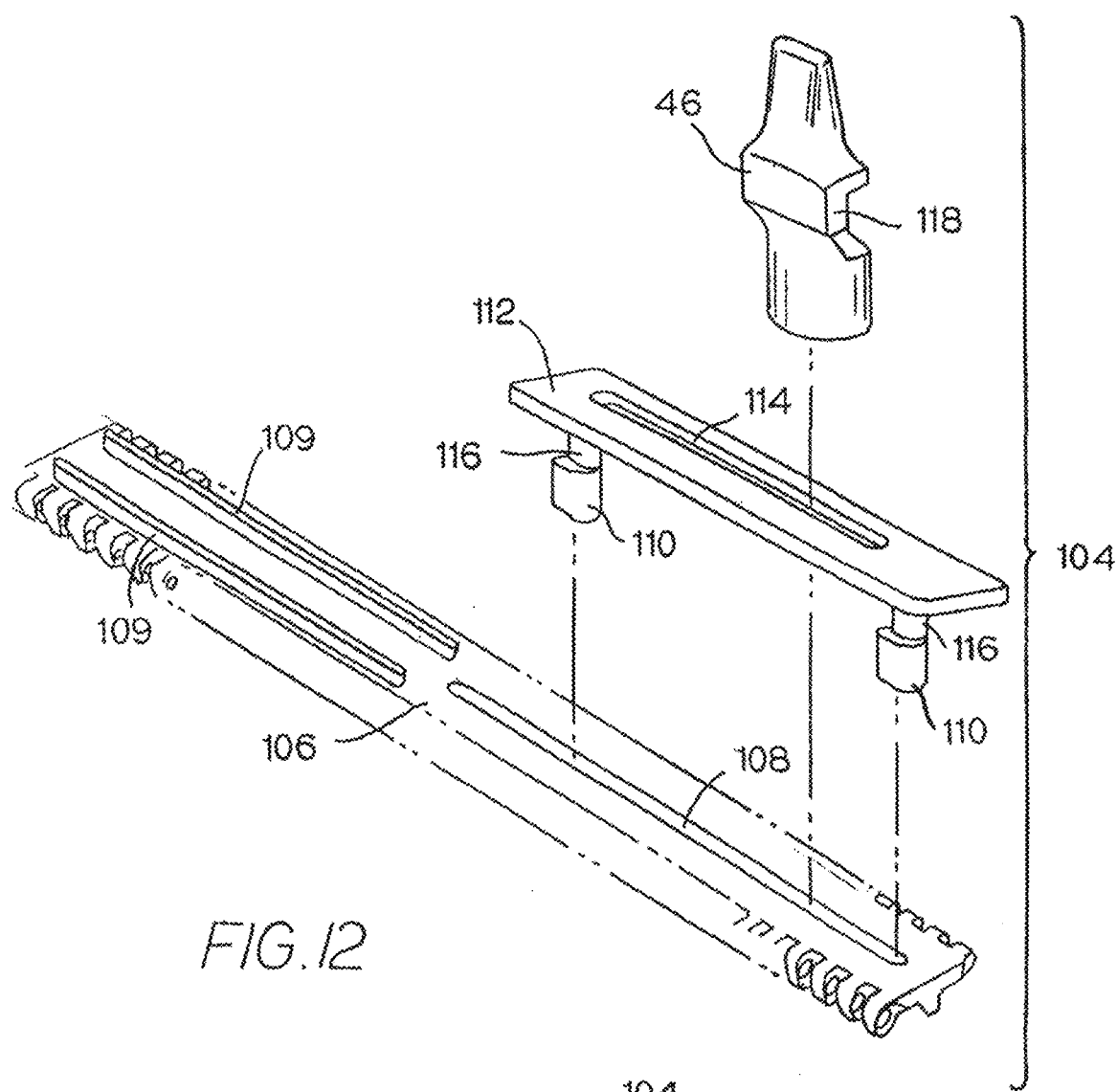
FIG. 12 is an exploded view of another version of a belt module usable in a diverting checkweigher as in FIG. 1A.
Figure 13:
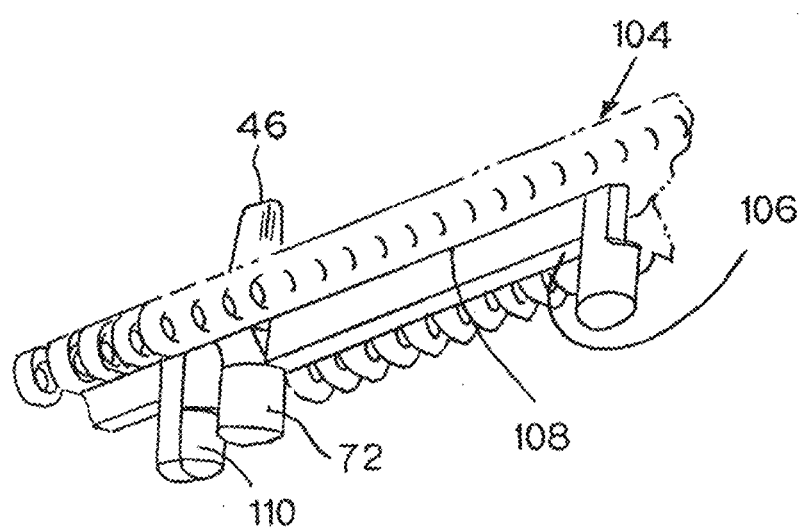
FIG. 13 is a bottom isometric view of the belt module of FIG. 12.
Figure 14A:
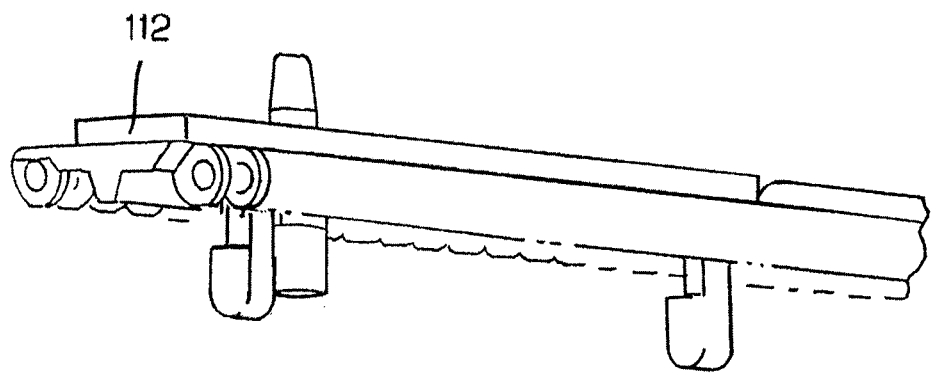
FIGS. 14A and 14B are axonometric views of the belt module of FIG. 12 with the product-support slat lowered in its standard position and raised when going over the weigh scale.
Figure 14B:
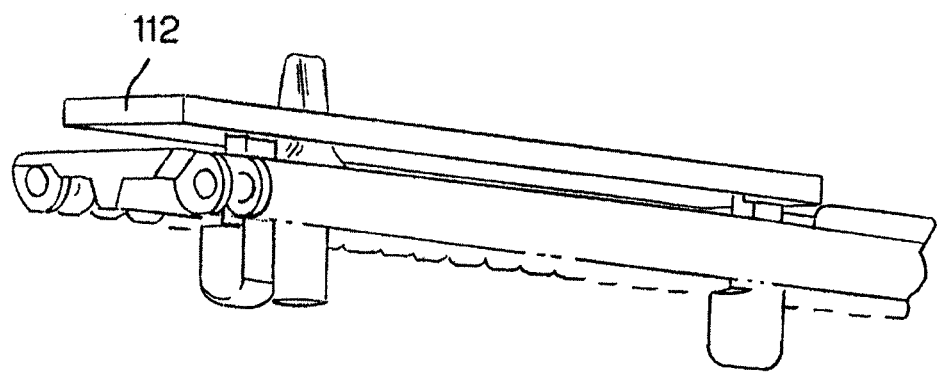
Figure 15:
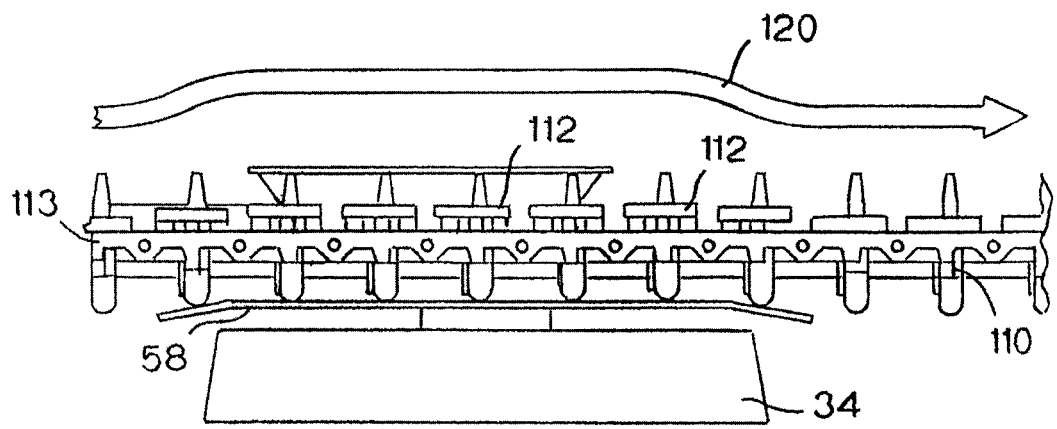
FIG. 15 is a side elevation view of a portion of a diverting checkweigher having a conveyor belt made of the modules of FIG. 12.

Another version of a module 104 usable in a diverting checkweigher is shown in FIG. 12. The module 104 includes a module base 106 having a slot 108 that extends across a portion of the width of the module. The other slotless portion of the module base 106 has a pair of raised, laterally extending ribs 109. The ribs 109 extend upward from the base 106 to about the same level as the tops of the slats 112 when lowered. The slot accommodates protrusions in the form of legs 110 depending from a slat 112 having a slot 114. A narrow upper portion 116 of the legs 110 rides in the module base's slot 108. The narrow portion 116 of the legs 110 is taller than the thickness of the slot 108 in the base 106 so that the slat 112 has some freedom to move, or float, vertically relative to the base. The peg 46 rides in the slat's slot 114 and in the aligned base slot 108 to divert conveyed products. When not encountering a weigh scale, the legs 110 of the slat extend through the slot 108 to a lowermost position below the bottom of the base 106 as shown in FIG. 13. The peg 46 also extends through the same slot 108 in the base 106 with its cam follower 72 below the bottom of the base. FIG. 14A shows the slat 112 in the lowered position as in FIG. 13, and FIG. 14B shows the slat 112 in the raised position during weighing. FIG. 15 shows the raising of the slats 112 in a belt 113 made of the modules 104 (FIG. 12) during weighing on the weigh scale 34. Note that, while the slats 112 are raised, the base modules 106 remain in place along the carryway. And the pegs 46 are not raised. Like the legs 110, the pegs 46 have tall narrow portions (118, FIG. 12) that accommodate the slight rise the slat 112 makes on contact with the weigh plate 58. The arrow 120 in FIG. 15 indicates the slight rise the slat 112 and the trays 102 undergo when encountering the weigh scale 34. The bottoms of the legs 110 are shown rounded for smoother entry onto the weigh plate 58. Alternatively, the bottoms could be chamfered.

Figure 16:
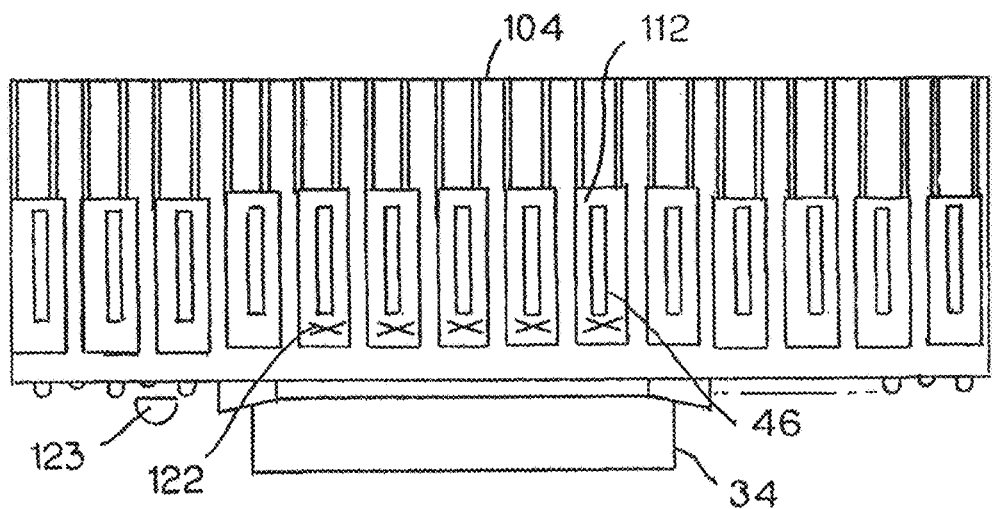
FIG. 16 is an oblique view of a checkweigher as in FIG. 15 illustrating a calibration scheme.

As shown in FIG. 16, one or more of the modules 104 can include a unique identifier 122, such as a visible indicator, a magnetic element, or an inductive loop, that can be detected by a position sensor 123. With an encoder or other means for determining belt speed, each of the unloaded slats can be weighed to calibrate the scale 34. Or a visioning system can be used. Such a calibration can be performed periodically to account for changes due to slat wear, temperature, or other causes.

Figure 17A:
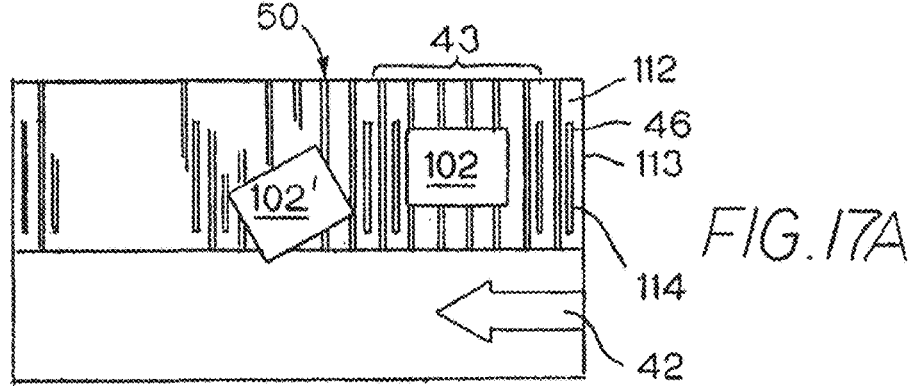
FIGS. 17A-17C are top plan views of a diverting checkweigher as in FIG. 16 showing the sequence of weighing and diverting reject products.
Figure 17B:
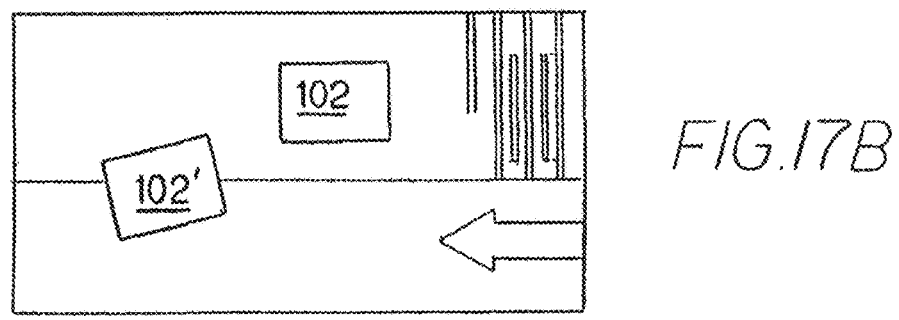
Figure 17C:
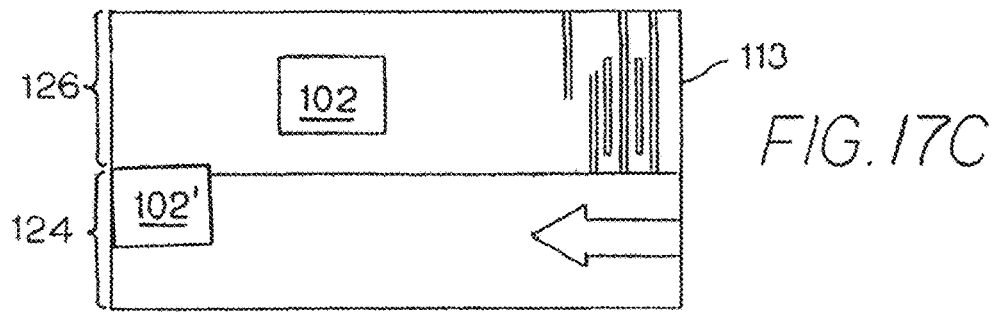

A reject conveyor using a belt 113 as in FIG. 15 is shown in FIGS. 17A-17C. The conveyor belt 113 is advancing in the direction of belt travel 42 with all trays 102 resting on the slats 112. The pegs 46 are parked at the outer ends of the slots 114 as they enter the weigh zone 43. If a tray 102' weighs less or more than acceptable, the diverter switch 50 under the belt 113 guides the pegs 46 across the belt. The diverter pegs 46 push the rejected tray 102 to the slotless side of the belt 113 as shown by the sequence in FIGS. 17A-17C. A standard-weight tray 102, on the other hand, is not diverted to the other side of the belt 113. The switch 50 allows the pegs 46 to remain in their parked position, and the trays 102 to remain atop the slats 112. As shown in FIG. 17C, rejected trays 102' exit the belt 113 in a reject lane 124, while accepted trays exit the belt 113 in an accept lane 126. So the checkweigher acts as a one-to-two switch reject conveyor. Because, with this version or with other checkweigher versions having divertible slats, products can span several slats 112, a sensor (not shown) can be used to determine how many slats each tray spans. The sensor can also detect empty slats 112. The sensor data can be used, for example, to divert unloaded slats 112 away from the weigh zone 43 or loaded slats to the weigh zone.

Figure 18:
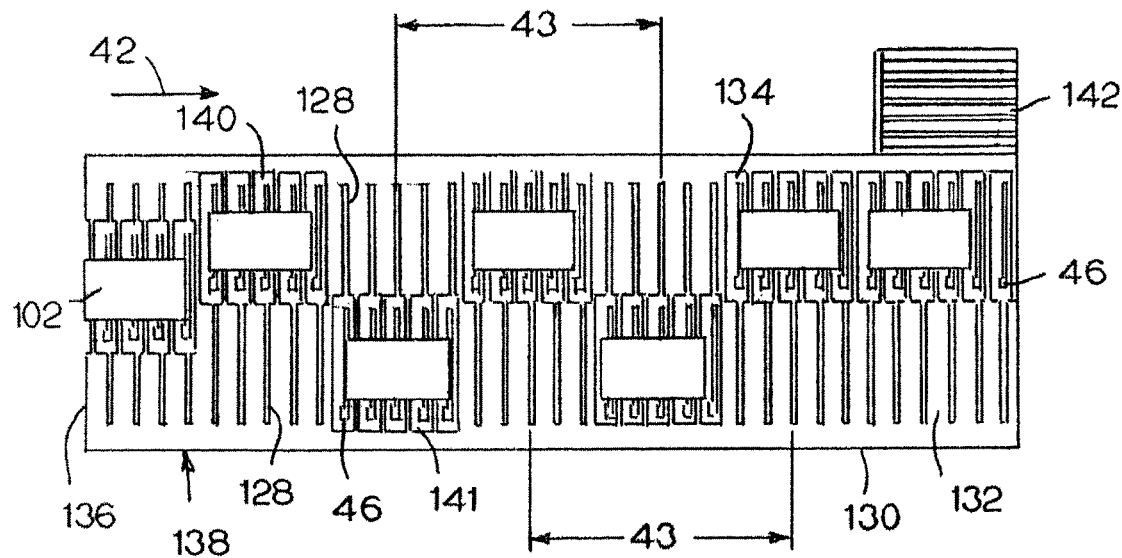
FIG. 18 is a top plan view of a dual-lane diverting checkweigher using the belt modules of FIG. 12, but with slat slots extending across the width of the modules.

The conveyor belt 113 of FIGS. 17A-17C is shown modified in FIG. 18. In this example the slots 128 in the module bases 130 extend across the majority of the width of the belt 132. Unlike the laterally stationary slats 112 of the belt 113 of FIGS. 17A-17C, slats 134 in the belt 132 of FIG. 18 are selectively divertible along the width of the belt. Pegs 46 associated with each of the divertible slats 134 are independently diverted by switches as previously described. These features make the belt 132 especially useful as a dual-lane diverting checkweigher. The slats 134 return to the carryway at the entrance end 136 of the conveyor at or near the center of the belt 132 to receive trays 102 as the conveyor belt 132 advances in the direction of belt travel 42. An alternating switch (not shown) under the belt 132 in the carryway at a slat switch position 138 guides one set 140 of consecutive slats to a first side of the belt and a next set 141 to an opposite second side. Each set 140, 141 includes a predetermined number of consecutive slats 134 that define a product zone, which is less than or equal to the length to the weigh zones. If a position-sensor or visioning system is used, the product zones could be variable in length depending on product length. Weighing occurs in weigh zones 43 formed by a weigh scale under each side of the belt. Each of the sets 140, 141 of consecutive slats 134 is equivalent in length to a weigh zone 43. The trays 102 are weighed in two parallel lanes to increase throughput. Once past the weigh zones 43, the sets 140, 141 of slats 140 can be returned by a switch to one side. And the pegs 46 can be used to selectively divert trays 102 off the same side of the belt 132 to a discharge conveyor 142. Alternatively, the sets of slats 140, 141 can remain in their individual lanes and the pegs 46 can be positioned to divert the trays 102 off both sides of the belt 132. The dual-lane checkweigher diverter is compared with a single-lane diverting checkweigher 143 in FIG. 19. In the single-lane checkweigher, the slats 144 are not laterally movable. After the trays 102 are weighed in the weigh zone 43, they are selectively diverted by a diverter switch 50 guiding the pegs 46 across the belt to push trays onto the discharge conveyor 142.

Figure 19:
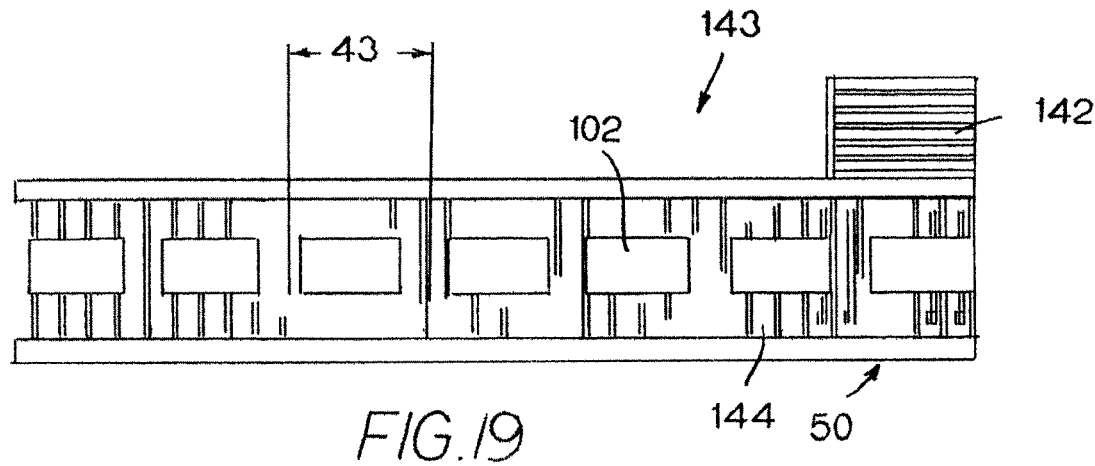
FIG. 19 is a top plan view of a portion of a single-lane diverting checkweigher using belt modules with pegs and slats as in FIG. 12 that extend across the width of the belt modules.
Figure 20:
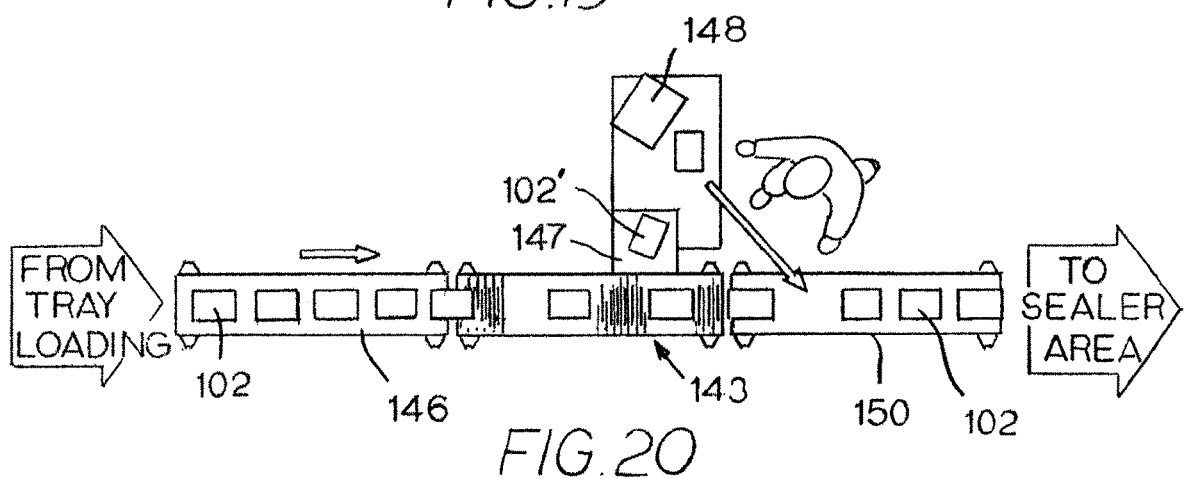
FIG. 20 is a top plan view of the single-lane checkweigher of FIG. 19 in a complete diverting-checkweigher configuration.

A simple repack application using the single-line diverting checkweigher of FIG. 19 is shown in FIG. 20. Loaded trays 102 are received in a single file on an infeed conveyor 146, which speeds up the trays to draw a gap between consecutive trays. The separated trays 102 are transferred onto the diverting checkweigher 143, which operates as described with respect to FIG. 18. Rejected trays 102' diverted off on the reject conveyor 147 are manually weighed on a scale 148 by an operator who adds to or removes product until the weight is correct. Once the weight is correct, the operator repacks the tray and manually places it on a discharge conveyor 150 with all the non-rejected trays 102. From the discharge conveyor 150 the trays 102 are sent to a sealer area.

Figure 21:
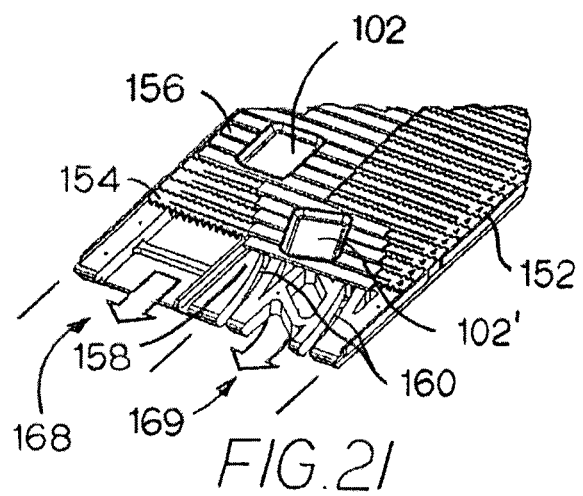
FIG. 21 is a partly cutaway isometric view of the exit portion of a diverting checkweigher embodying features of the invention including diverting slats.
Figure 22:
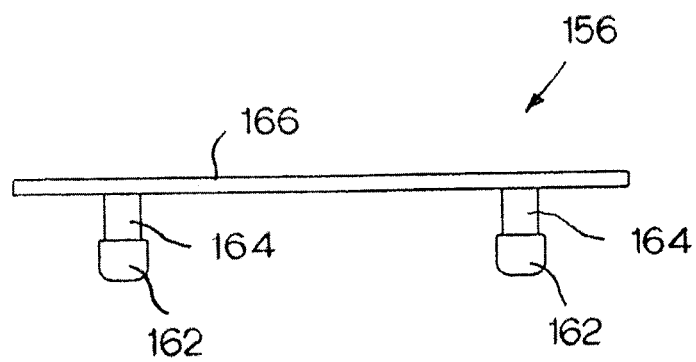
FIG. 22 is a front elevation view of a diverting slat as in FIG. 21.
Figure 23:
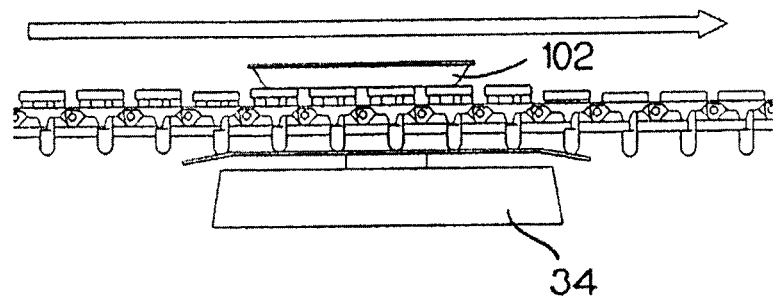
FIG. 23 is a side elevation view of the checkweigher of FIG. 21 at the weigh scale.

The exit end of another portion of a diverting checkweigher is shown in FIG. 21. A conveyor belt 152 is constructed of a series of belt modules 154 made up of a module base as in the modules 130 in FIG. 18. The only difference is that the belt modules in this version have slats 156 without slots and have no pegs. Trays 102 sit atop the slats 156. The trays are selectively diverted from one side of the belt 152 by a diverter switch 158 in the carryway. The diverter switch 158 provides cam guide surfaces 160 that guide cam followers 162 at the bottoms of legs 164 depending from the slat's top weigh platform 166, as shown in FIG. 22. As shown in FIGS. 21 and 23, the trays 102 are weighed by a weigh scale 34 in a first longitudinal belt lane 168 upstream of the diverter switch 158. The switch 158 allows in-spec trays 120 to remain on the first lane 168 by not diverting the slats 156 supporting the tray. Out-of-spec reject trays 120', on the other hand, are diverted by the switch 158 to a second longitudinal lane 169 parallel to the first lane 168. Thus, the diverting checkweigher selectively sorts weighed trays into a weigh lane 168 and a reject lane 169.

Figure 24A:
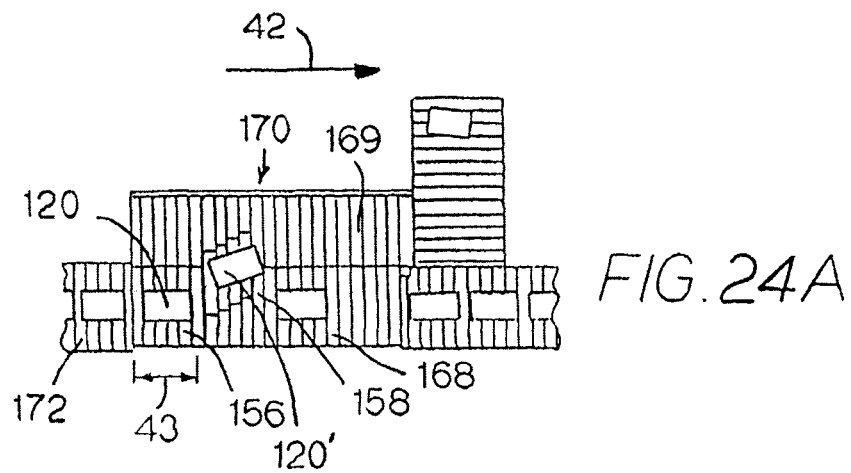
FIGS. 24A-24D are top plan views of a checkweigher as in FIG. 21 in a reject conveyor system.
Figure 24B:
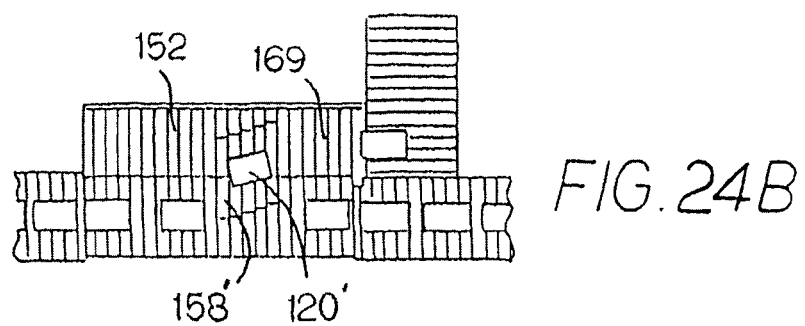
Figure 24C:
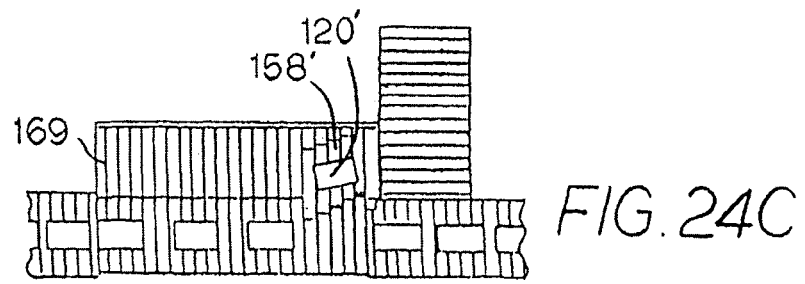
Figure 24D:
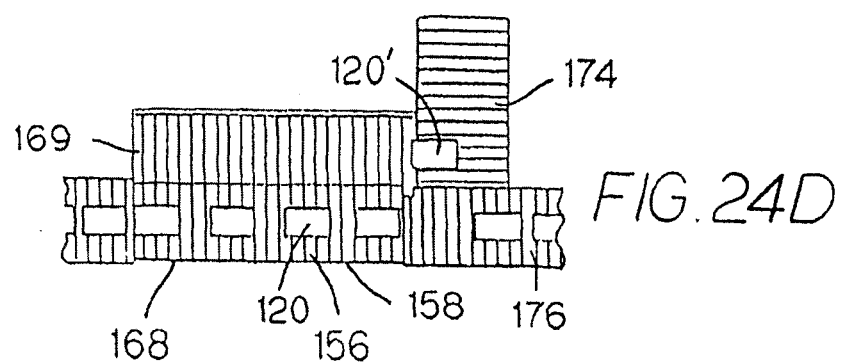

FIGS. 24A-24D show the operation of the diverting checkweigher of FIG. 21 in sequence. Trays 120 are fed single file onto the weigh lane 168 of the checkweigher 170 by an infeed conveyor 172. The trays atop the slats 156 are weighed in the weigh zone 43. If a tray 120' is underweight or overweight, it is transferred atop the diverted slats to the reject lane 169 by the diverting switch 158. As the conveyor belt 152 continues to advance in the direction of belt travel 24, the slats 158' under the out-of-spec tray 102' transition from the weigh lane 168 to the reject lane 169 as shown in FIGS. 24B and 24C. At the end of the reject lane 169, as shown in FIG. 24D, the out-of-spec tray 120' transfers from the diverted slats 158' to a reject conveyor 174. In the meantime the slats 156 supporting in-spec trays 120 are not diverted by the switch 158 to the reject lane. Instead, they pass through in the weigh lane 168 to a discharge conveyor 176.

Figure 25:
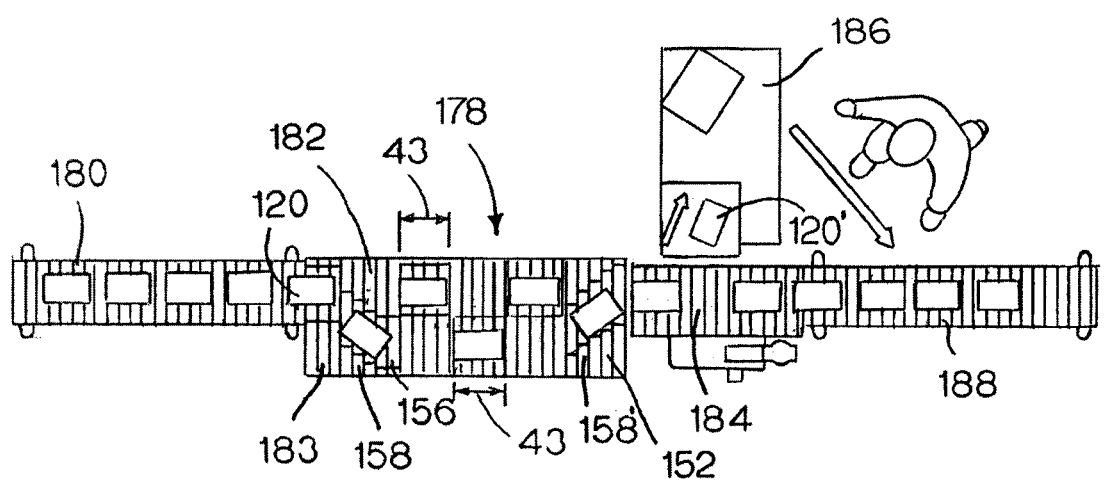
FIG. 25 is a top plan view of the checkweigher of FIG. 21 followed by a peg sorter.

The pegless slat belt 152 of FIG. 21 is used in the checkweigher of FIG. 25 to form a dual-lane checkweigher 178. Trays 120 fed onto the checkweigher 178 from an infeed conveyor 180 are received on slats 156 that return to the carryway in a first lane 182. The slats 156 are grouped into sets of consecutive slats that span the length of a weigh zone 43. Every other set of slats is diverted from the first lane 182 to a parallel second lane 183 by a diverter switch 158. A weigh scale under each lane 182, 183 defines the weigh zone 43, in which a tray 120 is weighed. Downstream of the weigh zone 43 in the second lane 183, a second diverter switch 158' diverts the slats 156 in the second lane 183 back to the first lane 182 to transfer the trays with the other trays to a sorter belt conveyor 184, such as a peg or shoe sorter, which selectively diverts out-of-spec trays to a reject conveyor 186 and passes in-spec trays to a discharge conveyor 188. Rejected trays 120' can be reworked and reweighed manually and placed on the discharge conveyor 188.

Thus, diverting checkweighers have been described that have slats that are vertically movable between a raised position by contact with a weigh scale and a lowered position otherwise. Also described are laterally stationary slats and laterally divertible slats that can be pushed across the width of a conveyor belt. The laterally stationary and the laterally divertible slats can have slots that accommodate pusher pegs or be slotless and pegless. In most cases, the pegs and the divertible slats can be returned to a base position on the lower belt return.

What is claimed is:

1. A checkweigher belt comprising:
   an endless belt body;
   a plurality of vertically floating, product-supporting weigh platforms located at spaced apart locations along the length of the endless belt body;
   wherein the weigh platforms are movable from a first position sitting on the belt body to a second position spaced apart from the belt body;
   wherein the weigh platforms are laterally divertible.

2. A checkweigher belt as in claim 1 wherein the weigh platforms include protrusions extending below the endless belt body to contact a weigh scale.

3. A checkweigher belt as in claim 1 wherein the weigh platforms further include stops to stop the weigh platform from moving beyond the second position.

4. A checkweigher belt as in claim 1 further comprising product pushers for diverting products atop the weigh platforms across the endless belt body.

5. A checkweigher belt comprising:
   an endless belt body advancing in a direction of belt travel along a carryway and bearing the belt tension, wherein the endless belt body has an outer surface extending along the width of the belt body from a first side edge to an opposite second side edge;
   a plurality of product-supporting slats spaced apart along the length of the belt body in the direction of belt travel, wherein each of the slats is elongated along the width of the belt body;
   wherein each of the slats is movable from a first position sitting on the outer surface of the belt body to a second position spaced apart from the outer surface of the belt body in a direction perpendicular to the outer surface of the belt body.

6. A checkweigher belt as in claim 5 wherein the endless belt body comprises a series of conveyor belt module bases connected together at hinge joints.

7. A checkweigher belt as in claim 5 wherein the slats include protrusions extending below the endless belt body.

8. A checkweigher belt as in claim 7 wherein the endless belt body includes slots extending therethrough along the width of the belt body and wherein the protrusions of the slats extend through the slots.

9. A checkweigher belt as in claim 7 wherein the slats are translatable across the width of the belt body along the slots.

10. A checkweigher belt as in claim 7 wherein the slats include slots aligned with the slots through the endless belt body and wherein the checkweigher belt further includes product pushers that extend through the aligned slots and that are translatable along the aligned slots.

11. A checkweigher belt as in claim 5 wherein the slats extend across the entire width of the belt body and the protrusions extend from the slats outward of the first and second side edges of the belt body.

12. A diverting checkweigher comprising:
    a carryway;
    a checkweigher belt advancing along the carryway in a direction of belt travel, the checkweigher belt including:
       an endless belt body bearing the belt tension, wherein the endless belt body has a top surface and an opposite bottom extending along the width of the checkweigher belt from a first side to an opposite second side;
       a plurality of product-supporting slats spaced apart along the length of the checkweigher belt in the direction of belt travel, wherein each of the slats is elongated along the width of the checkweigher belt and includes one or more protrusions extending below the bottom of the endless belt body;
    a weigh scale having a weigh plate lying under the bottom of the endless belt body in the carryway and positioned to contact the protrusions as they pass by on the advancing checkweigher belt to lift the slats from a lowered position sitting on the top surface of the belt body to a raised position spaced apart from the top surface of the belt body so that the weights of the products supported on the raised slats are borne by the weigh plate and measured by the weigh scale.

13. A diverting checkweigher as in claim 12 wherein the endless belt body comprises a series of conveyor belt module bases connected together at hinge joints.

14. A diverting checkweigher as in claim 12 wherein the endless belt body includes slots extending therethrough along the width of the checkweigher belt at spaced apart locations along the length of the checkweigher belt and wherein the protrusions of the slats extend through the slots.

15. A diverting checkweigher as in claim 14 wherein the slats are translatable across the width of the checkweigher belt along the slots and wherein the diverting checkweigher further comprises a diverter switch in the carryway for contacting the protrusions to selectively guide the slats across the width of the checkweigher belt or allow the slats to pass the diverter switch without diversion.

16. A diverting checkweigher as in claim 15 wherein a predetermined number of consecutive slats define a product zone and wherein the diverter switch diverts the all the consecutive slats defining a product zone or allows all the consecutive slats defining a product zone to pass the diverter switch without diversion.

17. A diverting checkweigher as in claim 15 comprising a plurality of weigh scales having weigh plates lying under the checkweigher belt in different parallel lanes across the width of the checkweigher belt so that products atop the slats can be weighed by the weigh scales in parallel.

18. A diverting checkweigher as in claim 14 wherein the slats include slots aligned with the slots through the endless belt body and wherein the checkweigher belt further includes product pushers that extend through the aligned slots and have cam followers extending below the bottom and wherein the diverting checkweigher further comprises a diverter switch in the carryway for contacting the cam followers to selectively guide the pushers across the width of the checkweigher belt to divert products.

19. A diverting checkweigher as in claim 12 wherein the endless belt body includes slots extending therethrough along the width of the checkweigher belt at spaced apart locations along the length of the checkweigher belt and wherein the diverting checkweigher further comprises a plurality of product pushers and wherein the product pushers and the protrusions of the slats extend through the slots at alternating locations along the length of the checkweigher belt.

20. A diverting checkweigher as in claim 12 wherein the diverting checkweigher further comprises a plurality of product pushers and a diverter switch in the carryway downstream of the weigh scale for contacting the product pushers to selectively guide the slats across the width of the checkweigher belt or allow the slats to pass the diverter switch without diversion depending on the weights of the products measured by the weight scale.

21. A diverting checkweigher as in claim 20 further comprising one or more conveyors along at least one of the first and second sides of the checkweigher belt downstream of the weigh plate onto which the product pushers divert products as a function of the weights of the products.

* * * * *